United States Patent
Fischer et al.

(10) Patent No.: US 8,711,592 B2
(45) Date of Patent: Apr. 29, 2014

(54) LINEAR TRANSFORMER POWER SUPPLY

(75) Inventors: Mark C. Fischer, Siler City, NC (US);
Kenneth C. Shuey, Zebulon, NC (US)

(73) Assignee: Elster Solutions, LLC, Raleigh, NC (US)

(*) Notice: Subject to any disclaimer, the term of this patent is extended or adjusted under 35 U.S.C. 154(b) by 474 days.

(21) Appl. No.: 13/165,409

(22) Filed: Jun. 21, 2011

(65) Prior Publication Data
US 2012/0327695 A1    Dec. 27, 2012

(51) Int. Cl.
*H02M 7/00* (2006.01)

(52) U.S. Cl.
USPC ............................ 363/125; 363/82; 323/205

(58) Field of Classification Search
USPC ......... 363/81, 82, 90, 125–127; 323/205–211
See application file for complete search history.

(56) References Cited

U.S. PATENT DOCUMENTS

| | | | |
|---|---|---|---|
| 4,206,367 A | 6/1980 | Petruska et al. | |
| 4,970,459 A | 11/1990 | Germer et al. | |
| 5,050,057 A * | 9/1991 | Notohara et al. | 363/37 |
| 5,637,989 A | 6/1997 | Wood | |
| 5,757,627 A | 5/1998 | Faulk | |
| 6,256,214 B1 * | 7/2001 | Farrington et al. | 363/127 |
| 6,836,099 B1 | 12/2004 | Amarillas et al. | |
| 7,075,799 B2 | 7/2006 | Qu | |
| 7,102,490 B2 | 9/2006 | Flen et al. | |
| 7,633,780 B2 | 12/2009 | Endo et al. | |
| 7,821,801 B2 * | 10/2010 | Janson et al. | 363/126 |
| 7,916,505 B2 | 3/2011 | Fornage | |
| 8,125,158 B2 | 2/2012 | Nishino et al. | |
| 2003/0043608 A1 | 3/2003 | Huang | |

FOREIGN PATENT DOCUMENTS

WO    WO 2006/070254 A2    7/2006

* cited by examiner

*Primary Examiner* — Jessica Han
(74) *Attorney, Agent, or Firm* — Baker & Hostetler LLP

(57) ABSTRACT

A linear transformer power supply is disclosed that extracts a high level of energy from a linear transformer during the full cycle of AC input voltage.

15 Claims, 3 Drawing Sheets

LINEAR TRANSFORMER POWER SUPPLY

TECHNICAL FIELD

This application relates to the field of power supplies.

BACKGROUND

Power supplies are used in a wide variety of applications. Many power supplies, including for example those used in residential electricity meters, deliver power levels in the range of 1-2 watts. These power supplies typically use linear transformers at 50-60 Hertz (Hz) as the main source of voltage conversion. The use of a linear transformer may reduce overall cost and eliminate the need for peripheral equipment normally associated with protection from voltage transients on the input voltage.

In a conventional full-wave rectifier power supply, filter capacitors typically sit directly on the output of a diode bridge. The filter capacitors draw current from the transformer at any time the output voltage of the transformer is higher (by two diode drops) than the direct current (DC) voltage on the capacitors. The energy delivered to the capacitors is proportional to the difference in the transformer output voltage and the rectified DC voltage and inversely proportional to the impedance of the transformer. At all times in the alternating current (AC) voltage cycle where the transformer output voltage is less than the rectified DC voltage, there is no energy delivered to the capacitors.

Peak power requirements in many applications, such as for example new utility metering applications, may reach six watts for sustained periods of time. The majority of power supplies that can source such peak power levels are designed as off-line, switching power supplies. A typical off line switching supply provides some filtering of the 120 or 240 volt alternating current (VAC) input voltage and rectifies the AC voltage to create a high voltage DC. The high voltage DC feeds a converter chip and high frequency transformer to develop a switching conversion from the high voltage DC down to low voltage for use by the device in which the power supply is used.

One problem associated with off-line, switching power supplies is protection of the electronics from high voltage transients. Because the supply is being required to deliver significant power levels, the allowable input impedances must be relatively low. The result of these low input impedances is higher fault currents associated with voltage transients and correspondingly higher stresses on all front-end components. Parts costs and reduced reliability reflect the higher stresses.

SUMMARY

A linear transformer power supply is disclosed that extracts a high level of energy from a linear transformer during the full cycle of AC input voltage. In one embodiment, the linear transformer power supply comprises a transformer having a primary winding that receives an alternating current (AC) input voltage and a secondary winding which produces an AC output voltage. A rectifier is connected to receive the AC output voltage from the secondary winding of the transformer and to produce a rectified output voltage. A capacitor is connected to receive the rectified output voltage; the resulting voltage on the capacitor defines an output voltage of the power supply. A switch is connected such that, when in a closed position, the switch shorts the secondary winding of the transformer and causes energy to be stored in the primary and secondary leakage reactances of the transformer, and when in an open position, allows the stored energy in the primary and secondary leakage reactances to pass through the rectifier to the capacitor. A controller opens and closes the switch at a duty cycle and frequency that develops a quasi-sinusoidal current being drawn from the AC input voltage. The duty cycle and frequency may substantially match the leakage reactances of the primary and secondary windings of the transformer.

Other features of the power supply will become evident from the following drawings and detailed description.

BRIEF DESCRIPTION OF THE DRAWINGS

The foregoing summary, as well as the following detailed description, is better understood when read in conjunction with the appended drawings. For the purpose of illustrating the power supply described herein, there is shown in the drawings exemplary embodiments; however, the invention is not limited to the specific instrumentalities disclosed. In the drawings.

DETAILED DESCRIPTION OF ILLUSTRATIVE EMBODIMENTS

Embodiments are described below, but it is understood that the invention is not limited to those specific embodiments. While certain details have been provided to illustrate the embodiments described below, it is understood that the invention may be practiced without those specific details. Acronyms and other terms may be used in the following description, however they are not intended to limit the scope of the invention as defined by the appended claims.

Figure 1:
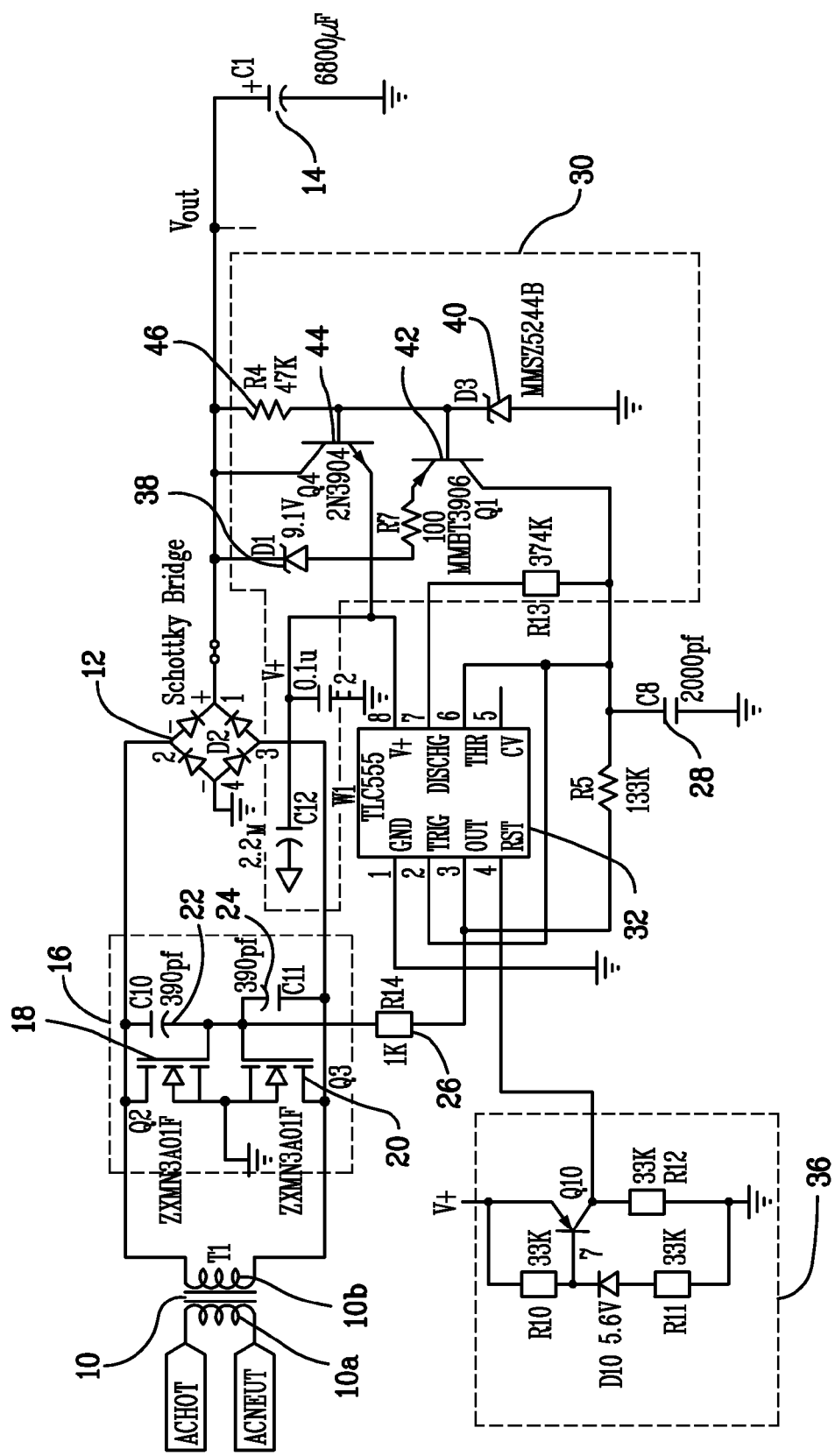
FIG. 1 is a schematic diagram illustrating one embodiment of a linear transformer power supply.

FIG. 1 is a schematic diagram illustrating one embodiment of a linear transformer power supply. In this embodiment, the power supply comprises a transformer 10 having a primary winding 10a that receives an alternating current (AC) input voltage (not shown) and a secondary winding 10b which produces an AC output voltage. In one example application, the primary winding 10a of the linear transformer 10 may be connected to a low voltage output of a distribution transformer (120 or 240 VAC) (not shown). A rectifier 12 may be connected to receive the AC output voltage from the secondary winding 10b of the transformer 10 and to produce a rectified output voltage. In the illustrated embodiment, the rectifier 12 comprises a full-wave rectifier. A capacitor 14 may be connected to receive the rectified output voltage produced by the full-wave rectifier 12; the resulting voltage on the capacitor 14 defines an output voltage of the power supply. A switch 16 may be connected such that, when in a closed position, the switch shorts the secondary winding 10b of the transformer 10 and causes energy to be stored in the primary and secondary leakage reactances of the transformer 10, and when in an open position, allows the stored energy in the primary and secondary leakage reactances to pass through the full wave rectifier 12 to the capacitor 14. In the embodiment illustrated in FIG. 1, the switch 16 is connected between, and in parallel with, the secondary winding 10b of the transformer 10 and the full-wave rectifier 12. In other embodiments, the switch 16 may be connected in a different manner. A controller 32 may open and close the switch 16 at a duty cycle and frequency that develops a quasi-sinusoidal current being drawn from the AC input voltage.

In the embodiment illustrated in FIG. 1, the switch 16 may comprise a pair of transistors 18, 20. In one embodiment, each transistor 18, 20 may comprise a metal-oxide semiconductor field-effect transistor (MOSFET). However, in other embodiments, different types of transistors and other circuitry may be employed to implement the switch 16. As described above, the transistors 18, 20 of switch 16 may be connected such that they can short the secondary winding 10b of the transformer 10 under the control of the controller 32, which along with related circuitry 30, forms a switching regulator.

In one embodiment, the controller 32 comprises a TLC555 Timer circuit available from Texas Instruments. The circuitry 30 provides the feedback loop control that sets the output voltage and controls the TLC555 duty cycle to maintain the desired output voltage. The TLC555 normally charges and discharges capacitor 28 creating a triangle waveform at the desired operating frequency. When capacitor 28 is charging, switch 16 is on, shorting the secondary winding 10b of the transformer 10, and when capacitor 28 is discharging, switch 16 is off, releasing transformer energy into capacitor 14. When the voltage on capacitor 14 reaches the threshold set by zener diodes 38 and 40 in series (about 23V in this embodiment), transistor 42 begins to conduct current to reduce the charge time and thereby reduce the on time of switch 16. When the on time of switch 16 is reduced, the energy stored in the transformer 10 is reduced and the corresponding energy delivered to capacitor 14 is reduced. The result is that the output voltage is regulated.

In the present embodiment, transistor 44, resistor 46 and zener diode 40 provide an emitter-follower voltage regulator to limit the power supply to the TLC555 to approximately 14V.

In one embodiment, the controller 32 may open and close the switch 16 at a duty cycle and frequency that substantially matches the leakage reactances of the primary and secondary windings of the transformer. In greater detail, when a transformer is designed for an AC input, the magnetizing inductance is typically intended to be the controlling impedance to the AC input line, while the leakage reactance of the transformer diverts power from the transformer action of the transformer by providing a dividing impedance across which some of the AC line voltage drops. In this embodiment, the leakage reactance is being used to store and transmit energy. The leakage reactance of the primary shares the primary resistance of the transformer winding with the transformer inductance, but has a characteristic time constant that is different from the magnetizing inductance. Maximum power storage and transfer may be realized when this reactance/resistance combination is driven at a frequency that matches the leakage impedance to the total transformer resistance. The current in the transformer inductor during each on and off interval may be described by an exponential equation having L (inductance) and R (resistance) in its exponent, where L is divided by R. This division has units of time and determines the dependence of the power transfer upon frequency. In one example application, wherein the AC input voltage may be in the range of 50 to 60 Hz, the controller 32 may drive both transistors 18, 20 (i.e., switch 16) at a frequency of approximately 2.5 to 3.0 kilohertz (kHz) with a fifty percent (50%) duty cycle. However, in other embodiments, other frequencies and duty cycles may be employed to optimize performance in a given application.

In the embodiment illustrated in FIG. 1, during the AC cycle of the input voltage, the transistor 18, 20 that has positive drain-to-source voltage being delivered by the transformer 10 may conduct current in a forward direction, and the other transistor 18, 20 may conduct current in the reverse direction, since both channels may be fully enhanced. The drop across the enhanced transistors 18, 20 (MOSFETs in this embodiment) will be minimized by having both devices on rather than conducting current through the reverse body diode that may exist in both transistors.

In the embodiment shown in FIG. 1, whenever the gate-to-source voltage is positive, every half cycle of the transformer output voltage (which may be a 50 or 60 Hz AC voltage) may switch which transistor 18, 20 conducts drain-to-source and which transistor 18, 20 conducts source-to-drain. By turning the transistors 18, 20 of the switch 16 on for several hundred microseconds, the transformer secondary may be shorted and current may build gradually in the transformer leakage inductances (primary and secondary). The rate of current buildup is determined by the transformer voltage, the leakage reactance and the transformer internal resistance. The current cannot change instantaneously. When the transistors 18, 20 of the switch 16 are switched off, the energy stored in the leakage inductances in the transformer 10 may be delivered from the transformer 10, through the full wave diode bridge 12, to the capacitor 14. Maximum power transfer may be made available during the entire AC cycle with losses limited to IR drops in the transistors and voltage drops in the rectifying diodes. As mentioned above, the current drawn by the transistors 18, 20 comprises a quasi-sinusoidal waveform.

Preferably, the capacitor 14 on the output of the full-wave rectifier is sized to deliver the peak energy requirements of any instantaneous load (not shown) that may be connected to the output. Also, preferably, the power supply disclosed in FIG. 1 presents a power factor near unity to the input AC source.

In the embodiment disclosed in FIG. 1, the switching regulator (controller 32 and circuitry 30) senses the direct current (DC) voltage across the output capacitor 14, and when the desired voltage is reached (e.g., approximately 23 VDC in an example application), the controller 32 begins to reduce the amount of time the transistors 18, 20 of the switch 16 are driven on. This closed loop regulation provided by the switching regulator may maintain the voltage on the capacitor 14 at a desired level, nearly independently of loading.

With continued reference to FIG. 1, the capacitors 22, 24 that are connected from the drain-to-gate of the transistors 18, 20 control the rate of turn-on and turn-off of the transistors 18, 20. That is, capacitors 22, 24 control the steepness of the transition from open to shorted and back. These transitions represent frequency content that can resonate in the primary leakage reactance; the resonance is the RLC resonance of the primary winding. By limiting the frequency content of the transitions with capacitors 22, 24, the primary leakage reactance may be prevented from resonating at an unacceptable amplitude. In one embodiment, the capacitors 22, 24 may be sized in coordination with the series resistance (resistor 26) from the controller 32) to keep conducted interference within specified requirements of a given application of the power supply.

In this embodiment, circuitry 36 is provided which comprises a startup circuit that functions to ensure that the supply voltage to the controller 32 is sufficiently high before it is released to oscillate. Specifically, in this embodiment, the TLC555 is held in reset to ensure that the logic states are correct when the supply voltage is high enough to run the switching regulator.

In one embodiment, the typical thickness of the laminations of a 50-60 Hz transformer (approximately 14 mils) are reduced, which may reduce the eddy currents at a 2.5 kHz switch frequency without impacting the transformer cost excessively. Reducing the eddy current loss in the laminations may allow more power to be extracted from the power supply. Preferably, the thickness of the transformer laminations is reduced to 3 to 4 mils.

In one embodiment, the component values and transistors of the power supply are also selected to handle transient overvoltage conditions on the input that can create higher than normal currents on the secondary winding 10b when the transistors 18, 20 are in conduction. For example, transistors 18, 20 can be selected with peak current ratings of 30 Amperes to handle all worst case input voltage transients. When transistors 18, 20 are not in conduction, a value of 4700uf and voltage rating of 25V for the capacitor 14, and 30 Ampere peak rating for full-wave rectifier 12 can handle the worst case input voltage transients.

In some circuit applications, such as, for example, in an electricity meter wherein metering circuitry within the meter may need to be referenced to different power line potentials, it may be desirable to provide power supply isolation. The power supply of FIG. 1 provides inherent isolation through the transformer windings, so that metering circuitry or other application circuitry can be referenced to different potentials within the meter or external to the meter.

Figure 2:
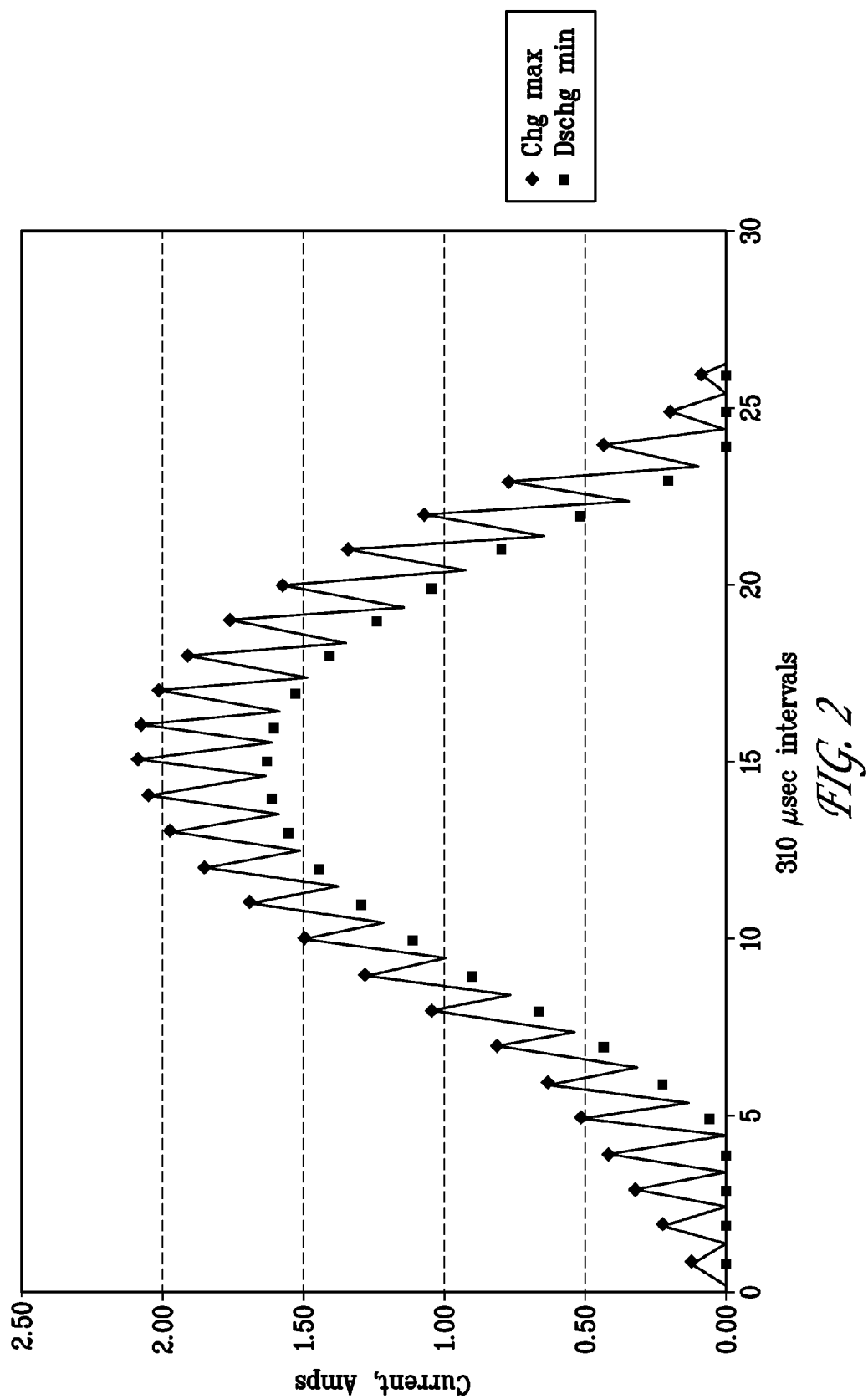
FIG. 2 is a plot of the quasi-sinusoidal current that is drawn from the secondary winding of the transformer by the switching regulator of the embodiment of FIG. 1 during heavy load conditions.

FIG. 2 is a plot of the quasi-sinusoidal current that is drawn from the AC transformer secondary 10b by the switching regulator (controller 32 and circuitry 30) during heavy load conditions. In this example, a resistive load (not shown) is applied in parallel with capacitor 14 and the current plot shown is one half cycle of the transformer output current that is delivered to supply the DC load requirement. The current plot shows triangle current segments associated with each operation of switch 16. In the plot, the positive slope of each current segment occurs when switch 16 is in conduction and shorting the secondary winding 10b, and the negative slope of each current segment occurs when switch 16 is not in conduction and the transformer 10 is delivering power to the load.

Figure 3:
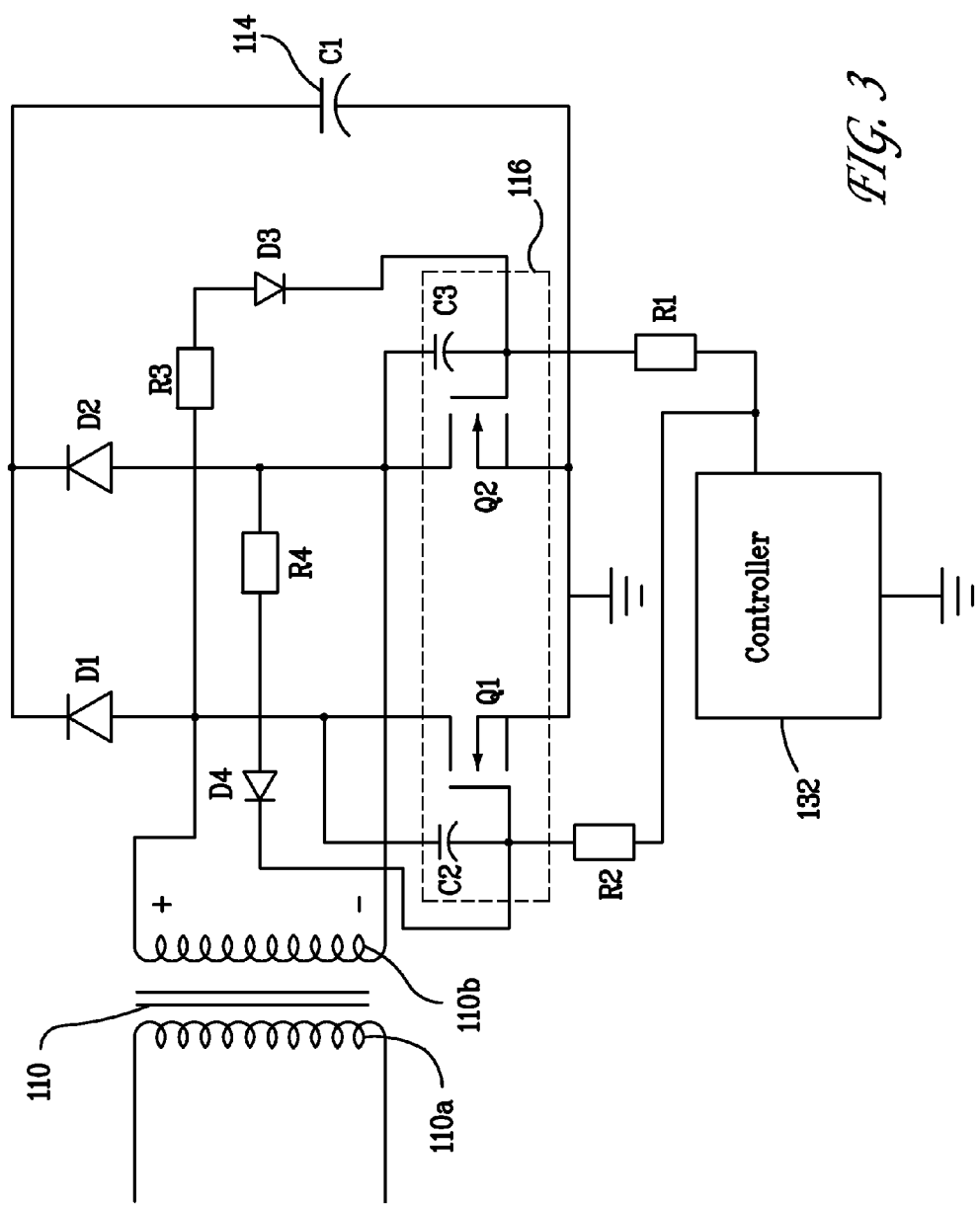
FIG. 3 is a schematic diagram illustrating an alternate embodiment of a linear transformer power supply.

FIG. 3 is a schematic diagram of an alternate embodiment of a linear transformer power supply in accordance with the principles described herein. This embodiment may provide reduced losses when the transformer 110 is delivering energy to the output capacitor 114 and load (not shown). As in the previous embodiment, rectification of the AC output of the transformer is provided. In this embodiment, a full-wave rectifier is formed by diodes D1 and D2 and transistors Q1 and Q2; transistors Q1 and Q2 have parasitic diodes in them that form an effective full wave bridge with diodes D1 and D2.

Also as in the previous embodiment, a switch 116, driven by a controller 132, operates to short the secondary winding 110b of the transformer 110 and store energy in the leakage reactances of the transformer during the charge portion of the switch cycle. Specifically, in this embodiment transistors Q1 and Q2 of the switch 116 are both driven into conduction in order to short the secondary winding 110b of the transformer 110 and store energy in the leakage reactances of the transformer during the charge portion of the switch cycle. However, in this embodiment only one of the two transistors Q1, Q2 is turned off at the end of each energy charge time. Aside from the difference just mentioned, the controller 132 may otherwise operate in essentially the same manner as the controller 32 of the embodiment illustrated in FIG. 1. For example, it may drive the switch 116 at a frequency and duty cycle similar to that described above for the embodiment of FIG. 1.

If the half cycle of the transformer 110 has the secondary winding 110b output voltage polarity as shown (+/−), then transistor Q2 may be driven into conduction for the complete half cycle. During the charge time, the controller 132 drives Q1 and Q2 into conduction and during the discharge time, the controller 132 output is low but the transformer output voltage drives Q2 into conduction through R3 and D3. By driving Q2 into conduction during the discharge time, the loss of the full wave rectifier may be reduced to the voltage drop of diode D1 plus the conduction drop of Q2. The conduction drop of Q2 may be less than that of a forward diode drop and consequently the efficiency of the power supply may be improved in this embodiment.

In a similar manner, when the voltage output of the transformer 110 is the opposite polarity from what is shown in the figure, transistors Q1 and Q2 are driven into conduction by the controller 132 for the charge time but Q1 is kept in conduction for the whole half cycle by voltage delivered through R4 and D4. Capacitors C2 and C3 provide the same rate of rise and rate of fall limiting as described for the embodiment of FIG. 1, so the conducted emissions may be controlled below specification values.

While example embodiments have been described above, modifications and variations may be made without departing from the principles described above and set forth in the following claims. Accordingly, reference should be made to the following claims as describing the scope of the present invention.

What is claimed:

1. A power supply comprising:
    a transformer having a primary winding that receives an alternating current input voltage and a secondary winding which produces an alternating current output voltage;
    a rectifier connected to receive the alternating current output voltage from the secondary winding of the transformer and producing a rectified output voltage;
    a capacitor connected to receive the rectified output, a resulting voltage on the capacitor defining an output voltage of the power supply;
    a switch connected such that, when in a closed position, the switch shorts the secondary winding and causes energy to be stored in the primary and secondary leakage reactances of the transformer, and when in an open position, allows the stored energy in the primary and secondary leakage reactances to pass through the rectifier to the capacitor; and
    a controller that opens and closes the switch at a duty cycle and frequency that develops a quasi-sinusoidal current being drawn from the alternating current input voltage.

2. The power supply recited in claim 1, wherein the controller opens and closes the switch at a duty cycle and frequency that substantially matches the leakage reactances of the primary and secondary windings of the transformer.

3. The power supply recited in claim 1, wherein the switch is connected between, and in parallel with, the secondary winding of the transformer and the rectifier.

4. The power supply recited in claim 1, wherein the alternating current input voltage has a frequency in the range of approximately 50 to 60 Hz, and wherein the frequency at which the switch is opened and closed is in the range of approximately 2.5 to 3 kilohertz.

5. The power supply recited in claim 1, wherein the output voltage of the power supply is a direct current (DC) output voltage, and wherein the controller comprises a switching regulator that is responsive to the DC output voltage of the power supply to adjust the frequency or duty cycle of the switch to maintain the output voltage at a desired level.

6. The power supply recited in claim 1, wherein the rectifier comprises a full-wave rectifier.

7. The power supply recited in claim 1, wherein the switch comprises a first transistor and a second transistor connected such that during a cycle of the alternating current input voltage, the transistor that has positive drain-to-source voltage being delivered by the transformer may conduct current in a forward direction, and the other transistor may conduct current in the reverse direction, and wherein whenever a gate-to-source voltage on the transistors is positive, every half cycle of the transformer output voltage switches which transistor conducts drain-to-source and which transistor conducts source-to-drain.

8. The power supply recited in claim 7, wherein the switch further comprises a pair of capacitors, each of which is connected from the drain-to-gate of a respective one of the first and second transistors to control a rate of turn-on and turn-off of the transistors.

9. The power supply recited in claim 1, wherein first and second windings of the transformer provide inherent isolation of the power supply, such that circuitry that forms a load on the power supply may be referenced to different potentials.

10. In a power supply comprising a transformer having a primary winding that receives an alternating current input voltage and a secondary winding which produces an alternating current output voltage, a rectifier connected to receive the alternating current output voltage from the secondary winding of the transformer and produce a rectified output voltage, and a capacitor connected to receive the rectified output voltage produced by the full-wave rectifier, wherein a resulting voltage on the capacitor defines an output voltage of the power supply, a method comprising:

opening and closing a switch such that, when in a closed position, the switch shorts the secondary winding and causes energy to be stored in the primary and secondary leakage reactances of the transformer, and when in an open position, allows the stored energy in the primary and secondary leakage reactances to pass through the rectifier to the capacitor, the switch being alternately opened and closed at a duty cycle and frequency that develops a quasi-sinusoidal current being drawn from the alternating current input voltage.

11. The method recited in claim 10, further comprising opening and closing the switch at a duty cycle and frequency that substantially matches the leakage reactances of the primary and secondary windings of the transformer.

12. The method recited in claim 10, further comprising connecting the switch between, and in parallel with, the secondary winding of the transformer and the rectifier.

13. The method recited in claim 10, wherein the alternating current input voltage has a frequency in the range of approximately 50 to 60 Hz, and wherein the method comprises opening and closing the switch at a frequency of approximately 2.5 to 3 kilohertz.

14. The method recited in claim 10, further comprising adjusting the frequency or duty cycle of the switch, responsive to the output voltage of the power supply, to maintain the output voltage at a desired level.

15. The method recited in claim 10, further comprising controlling the rate of turn-on and the rate of turn-off of the switch to reduce conducted emissions.

\* \* \* \* \*